(12) United States Patent
Korhonen

(10) Patent No.: US 7,139,954 B1
(45) Date of Patent: Nov. 21, 2006

(54) METHOD AND APPARATUS FOR TESTING A COMPUTING DEVICE WITH MEMORY USING TEST PROGRAM CODE

(75) Inventor: Aki Korhonen, Davis, CA (US)

(73) Assignee: PC-Doctor, Inc., Reno, NV (US)

( * ) Notice: Subject to any disclaimer, the term of this patent is extended or adjusted under 35 U.S.C. 154(b) by 1157 days.

(21) Appl. No.: 09/800,764

(22) Filed: Mar. 6, 2001

Related U.S. Application Data

(60) Provisional application No. 60/187,134, filed on Mar. 6, 2000.

(51) Int. Cl.
G01R 31/28 (2006.01)
G06F 11/00 (2006.01)

(52) U.S. Cl. ...................................... 714/736
(58) Field of Classification Search ............... 714/736, 714/718, 737, 741, 742, 25, 26, 743, 724
See application file for complete search history.

(56) References Cited

U.S. PATENT DOCUMENTS 5,758,056 A * 5/1998 Barr ........................ 714/7
6,144,930 A * 11/2000 Kinzelman ................. 703/13
6,463,550 B1 * 10/2002 Cepulis et al. .............. 714/25

\* cited by examiner

Primary Examiner—James C Kerveros
(74) Attorney, Agent, or Firm—Fliesler Meyer LLP

(57) ABSTRACT

An apparatus and a method for testing memory of a computing device, and more specifically to testing a Central Processing Unit (CPU), a system memory, and a combination thereof. The computing system includes one or more CPUs, a system memory, input and output devices. Among other features, the apparatus and method described herein can remove either a defective CPU or a defective portion of system memory from the computing device. An exemplary apparatus and method also reports to a computer user whether any CPU or system memory is defective as well as specifically identifying the defective computing component. The apparatus and method also detects a first defect related to a first corrupted portion of an instruction of a test program code and a second defect related to a second corrupted portion of the instruction.

20 Claims, 3 Drawing Sheets

METHOD AND APPARATUS FOR TESTING A COMPUTING DEVICE WITH MEMORY USING TEST PROGRAM CODE

CROSS-REFERENCES TO RELATED APPLICATIONS

This application claims priority from U.S. Provisional Patent Application No. 60/187,134, filed Mar. 6, 2000, entitled TESTING SYSTEM MEMORY USING PROGRAM CODE which is hereby incorporated by reference, as is set forth in full in this document, for all purposes.

BACKGROUND OF THE INVENTION

The present invention relates to testing memory of a computing device, and more specifically to testing a Central Processing Unit (CPU), a system memory, and a combination thereof.

The system memory is a place where a computer, or computing device, holds current computer programs (i.e., software) as well as data that are used in executing the computer programs. A system memory is an important part of the main processing subsystem of a computing device, such as a PC, and is tied in with the processor, cache, motherboard and chipset. Since reliability of system memory is a critical factor to the availability of a computing device, it is vital to identify defective system memory, especially when the memory is connected to a CPU.

A computing device having one or more CPUs is generally coupled to write data to and read data from one or more memory devices, wherein a CPU executes code typically from a system memory and then stores results for later action. The CPU provides controls signals, such as READ and Write, to govern the way in which data is exchanged while the CPU is processing. Additionally, an address bus connects the CPU to the memory and allows the CPU to address specific memory locations for storing computational results, or for fetching program instructions to be executed by a central processor. Furthermore, a data bus provides an interconnection between the CPU and memory for transporting data to and from the CPU. One or more CPUs coupled to one or more memory devices are hereinafter referred to as a "CPU-memory system."

Conventional system memory techniques for testing a memory coupled to a CPU write data into memory and then read it back to verify whether the actual data read from the memory is the same as the expected written data. The purpose of this test is to confirm that every storage location in a memory device is operating properly. For example if the number A5 hex is written into a particular address, that value should be stored there unit another number is written. Some memory test techniques combine several test numbers into a sequence of numbers, also known as a test pattern. Such patterns used for testing a memory's functionality include, for example, "walking ones," "checkerboard," etc.

With this traditional approach, three aspects of the memory are inherently tested. Those aspects include: (1) the data bus, (2) the address bus, and (3) the memory locations themselves. Traditional testing of a CPU-memory system generally detects electrical connection or logic problems between the CPU and memory, while testing the memory locations (i.e., third aspect) reveals potential catastrophic failures (e.g., inoperative memory locations). Traditional testing of the CPU-memory system also uncovers problems related to the control bus interconnections, it any.

There is a significant drawback, however, of using the traditional techniques to test the combined functionality of CPU-memory systems. In a CPU-memory system, CPUs typically handle fetching of computing instructions, also known as op-codes or "codes," and data from the memory differently. As illustrated in FIG. 1, internal to an exemplary CPU, data is accessed from memory 114 via internal system bus 112. Bus/memory interface 110 introduces a mixture of code and data into the CPU core 104 of the CPU 102, when accessed from memory 114. Bus/memory interface 110 separates the code and data and provides them respectively to a code cache 106 and data cache 108. Code cache 106 provides instructions to the CPU core 104 (i.e., "execution unit") for processing data, where code is conveyed by way of a code access path 105. Data cache 108 provides the data to the core 104 for processing, where data is conveyed by way of a data access path 107. Bus/memory interface 110 also recombines the code and data and sends them back out onto internal bus 112 to, for example, allow the data to be written into memory 114.

Although the data portion of an instruction and the corresponding data access path used during a data fetch operation are tested by the conventional approach, this approach fails to verify whether the memory or CPU is properly operable to in regards to the code access path. A defect in the instruction access path (i.e., code access path) between the CPU core 104 and the bus/memory interface 110 will result in illegal operation of the CPU-memory system. Furthermore, conventional testing techniques fail to detect the corruption of a code segment of a fetched instruction, which is recognized by the CPU-memory system as an invalid op code. A defective system memory, for example, may manifest in the corruption of code being accessed by the CPU during the execution of a unique sequence of instructions.

Since conventional testing techniques fail to optimally screen for defects, manufacturers, service providers and consumers both must expand significant resources to address such defects. Thus, there is a need for a system and a method for screening system memories, as well as CPU-memory systems, to detect specific failure modes that otherwise are not detected by conventionally known testing systems and methods.

SUMMARY OF THE INVENTION

According to the present invention, a technique for detecting defects in computing systems, where the computer systems include one or more central processing units and a system memory configurable to de-allocate defective portions thereof. The technique can remove either a defective CPU or a defective portion of system memory. Also included in the exemplary method is the ability to report to a computer user whether any CPU or system memory is defective.

In a specific embodiment, the method comprises loading a test program code into an area of the system memory to test, the test program code having a plurality of instructions configured to detect one or more defects in the system, fetching an instruction of the test program code from the system memory, executing the instruction within a CPU and determining whether the executed instruction yields a test result in conformance with an expected result.

In another specific embodiment, a computer-readable medium has stored thereon instructions which when executed by a CPU, cause the CPU to perform an inventive process. The process includes loading a test program code into an area of a system memory to test, the test program code having a plurality of instructions configured to detect one or more defects in the system memory. It also includes fetching an instruction of the test program code from the system memory, and executing the instruction within a CPU. When instructions fetched from a computer-readable medium are executed by a CPU, the instructions also cause the CPU to determine whether executed instruction of a test program code yields a test result in conformance with an expected result, wherein a nonconforming test result indicates the presence of the defect in the system memory.

A further understanding of the nature and advantages of the inventions herein may be realized by reference to the remaining portions of the specification and the attached drawings which describe specific forms of the invention, by way of example.

DESCRIPTION OF THE SPECIFIC EMBODIMENTS

Figure 2:
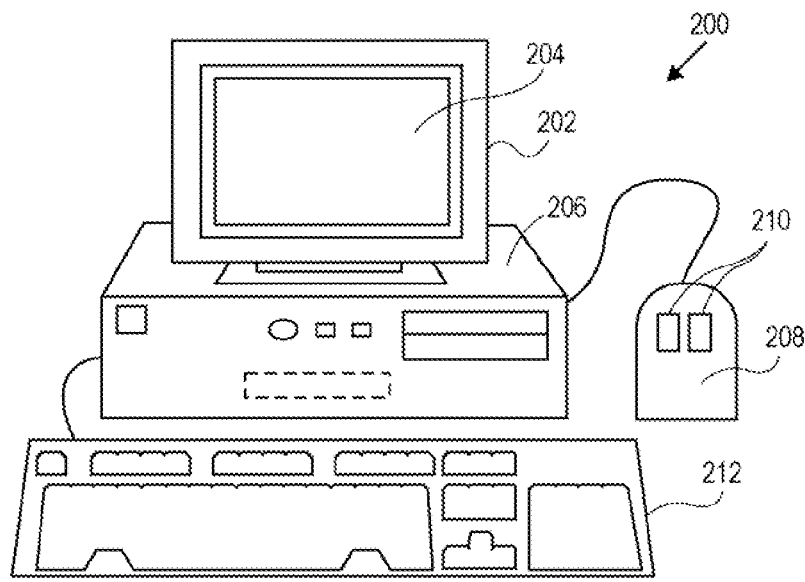
FIG. 2 is an exemplary apparatus including a basic computer system for executing the software and test program instructions according to an embodiment of the present invention.

FIG. 2 shows a computing device 200 suitable for use in one or more embodiments of the CPU-memory system as well as performing its function of testing such a CPU-memory system, according to the present invention. Computing device 200 includes display 202 having display screen 204. Cabinet 206 houses standard computer components (not shown) such as a disk drive, CD-ROM drive, display adapter, network card, random access memory (RAM), central processing unit (CPU), and other components, subsystems and devices. User input devices such as a mouse 208 having buttons 210, and a keyboard 212 are shown. User input devices, however, may also include voice command activated input devices as well as touch pads and the like. Other user input devices such as a trackball, touch-screen, digitizing tablet, etc. can be used. In general, the computing device 200 is illustrative of one type of computer system, such as a desktop computer, suitable for use with the present invention. Computers can be configured with many different hardware components and can be made in many dimensions and styles (e.g., laptop, palmtop, server, workstation, mainframe). Thus, any hardware platform suitable for performing the processing described herein is suitable for use with the present invention.

Figure 3:
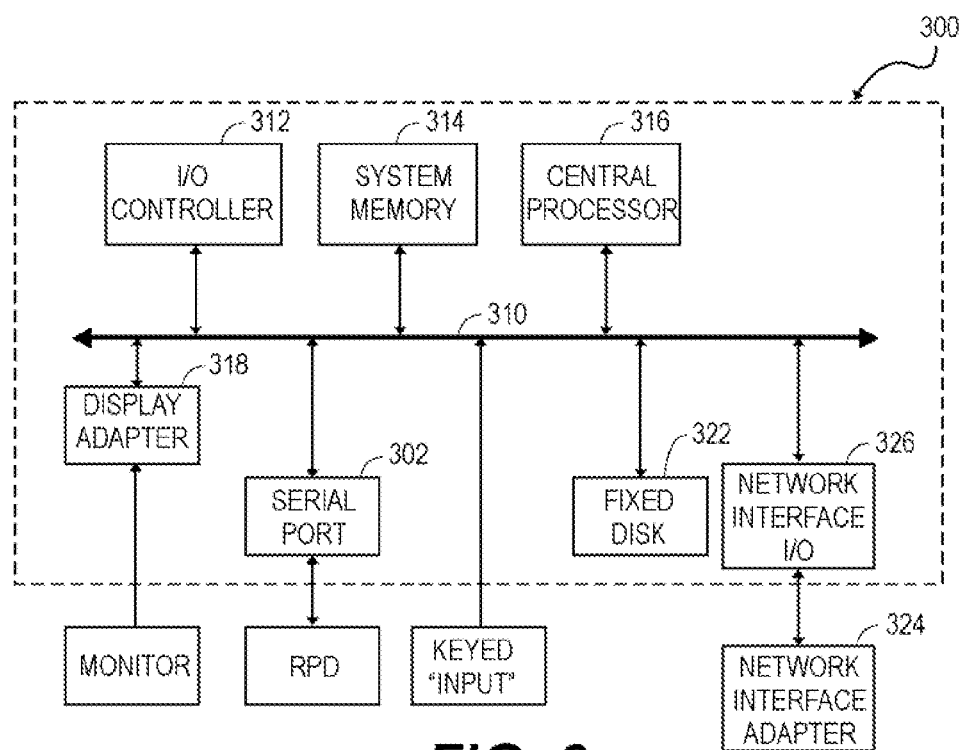
FIG. 3 is a simplified diagram of subsystems in the computer system of FIG. 2.

FIG. 3 illustrates subsystems that might typically be found in a computer device such as computing device 300. Subsystems within the cabinet 206 of FIG. 2 are directly interfaced to an internal bus 310. Such subsystems typically are contained within the computer system, such as within the cabinet 206 of FIG. 2. The subsystems include an input/output (I/O) controller 312, system memory, such as Random Access Memory (RAM) 314, one or more Central Processing Unit (CPU) 316, display adapted 318, communications port 302, such as a serial port, Fixed Disk 322 and network interface adapter 324 with network I/O 326. The use of the bus 310 allows each of the subsystems to exchange data with other subsystems and, most importantly, with the one or more CPU 316. External devices can communicate with the CPU 316 or other subsystems via the bus 310 or by interfacing with a subsystem connected to the bus 310. The network interface adapter 324 of FIG. 3 includes communication ports which are configured to access and communicate data to and from a remote testing administrator (not shown), where communication occurs over a communication network, such as the Internet.

Monitor 204 connects to the bus 310 through display adapter 318. A relative pointing device (RPD) such as a mouse 208 connects through serial port 302. Some devices such as keyboard 212 can communicate with the CPU 316 by direct means without using the main data bus as, for example, via an interrupt controller and associated registers (not shown).

As with the external physical configuration shown in FIG. 2, many subsystem configurations are possible. FIG. 3 is illustrative of one suitable configuration. Subsystems, components or devices other than those shown in FIG. 3 can be added. A suitable computer system can be achieved without using all of the subsystems shown in FIG. 3. Other subsystems such as a CD-ROM drive, graphics accelerator, etc. can be included in the configuration without affecting the performance of the system of the present invention.

The most common CPU-based computing system includes on Intel Pentium® processor, where the computing system functions with a MS-DOS (Microsoft® Disk Operating System) or a Microsoft Windows® operating system. For illustrative purposes, there will now be presented a specific embodiment of the present invention designed to operate in a Intel Pentium-based as well as X86-based microprocessor systems. Therefore, it is assumed that the reader is familiar with the structure and operability of Intel CPUs as well as the applicable types of memory available to be used as system memory. System memory used in the system described herein generally refers to RAM (Random Access Memory) and those skilled in the art. Furthermore, system memory might be a single device or disk, but may comprise any number or combination thereof.

Figure 4:
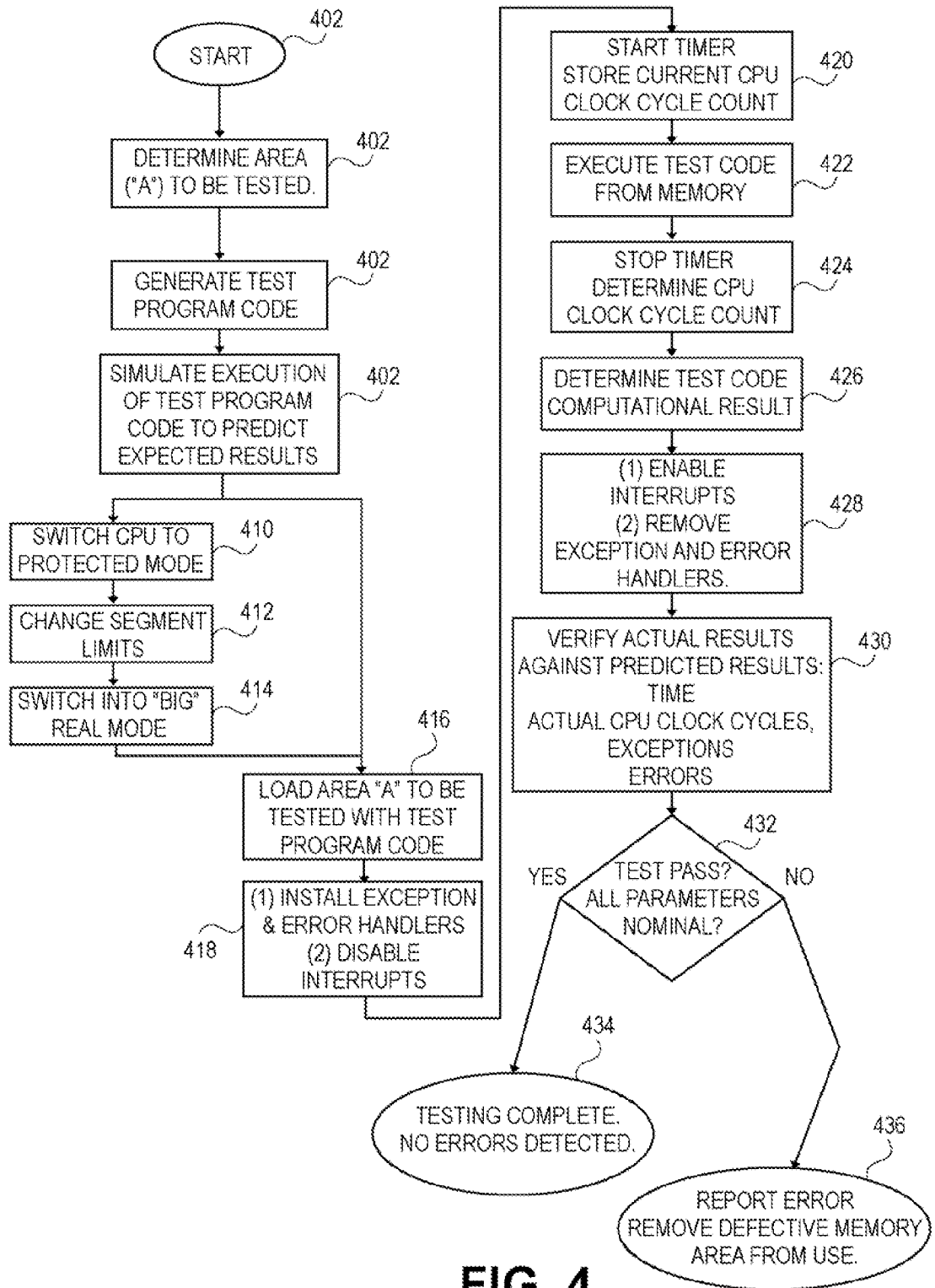
FIG. 4 is a simplified flow diagram illustrating an exemplary method preformed by the computer system of FIG. 2 according to an embodiment of the present invention.

FIG. 4 is a simplified flowchart illustrating an exemplary method performed according to a specific embodiment of the present invention. In FIG. 4, the method of screening system memories as well as detecting CPU failure modes begins at 402. Such a method may be part of any of the following testing procedures: a processor manufacturer testing the CPU itself, a computer manufacturer testing the CPU, the memory, and operation of the combination thereof, or an end user (e.g., consumer) or a field service technician testing the CPU, whether automatically as part of the boot-up process or manually invoked as part of a diagnostic program for trouble-shooting the performance of a computing device. Depending on the application in which this method is used in, the acts from 404 through 408 may be performed as part of the immediate testing of CPU device or system, or may be performed at a remote place or time. A person of ordinary skill in the art will know of other ways and methods to utilize the method described herein in accordance with the present invention.

At 404, an area "A" of the system memory which is to be tested is determined. Area A may include contiguous memory locations and non-contiguous memory locations which may spread over one or more memory devices or storage media devices. Area A is defined to exclude reserved memory locations, such as system devices, Read Only Memory (ROM), as well as other predetermined memory locations.

At 406, test program code is generated to identify the functional defects of the system memory, the CPU, and the combined CPU and memory systems. Such test program code may be automatically generated or designed manually to screen out specific "bugs" which neither the CPU manufacturer nor the system memory manufacturer uncovered under respective quality tests. Persons with ordinary skills in the art should understand how to employ automatic test pattern generation ("ATPG") techniques to develop and generate test program code, and should also know how to use in-circuit emulation techniques to manually develop test program code. The test program code used in an exemplary system and method of the present invention includes assembler instructions or machine code associated with the CPUs under test.

Generating test program code for use in a system includes first identifying or predicting a type of failure mode. Execution of the test program code will then screen out the targeted failure mode for which the code was created. A simple test program code for testing a CPU-memory system uses multiple "increment" program instructions (e.g., "INC") throughout the allocated memory "A." For example, for testing an Intel CPU-based system, each of the address locations which make up an area "N" are programmed with the increment instruction for adding the value of one to whatever initial value is stored or loaded into a register, such as EAX, EAX is a CPU register and is used as an accumulator. In this example, the accumulator is generally initialized to a value of zero by set-up code in the beginning addresses of the system memory. Additional to the set-up code is exiting code placed at the end of the test program code, where such exiting code is used to provide a result to the CPU for verifying whether the CPU memory system operated properly. For illustrative purposes, assume area "M" comprises both set-up and exiting code programmed before and after the test program code, such that M=A−N.

If area "N" comprises all address locations programmed with that instruction, then after the CPU fetches all those instructions for execution, a properly functioning CPU-memory system is expected to yield the value "N" in register EAX after execution. That is, if EAX held the value "0" after initialization, then after the CPU executes the Nth instruction at the Nth address from the first INC instruction, EAX will hold the value of N. As the CPU executes the test program code, the initial value of "0" is incremented by 1 for an N number of times (assuming the INC EAX instruction occupies only one memory location).

According to a specific embodiment, the test program code further includes additional instructions which repeat sequentially throughout memory space N (e.g., ADD, SUB, MOV, etc.) and also includes more complex instructions, such as a conditional branching instructions (i.e., JUMP). A skilled artisan familiar with assembler languages should be aware of the possible instructions to test a CPU-memory according to the present invention.

At 408, the test program code is simulated to generate expected results of the test program code after execution. In-circuit emulators ("ICE"), code debugging systems, and other simulation techniques are well known and may be used to determine the computational result that a particular test program code is expected to yield. Such a result will be used in programming a system memory so as to verify whether the CPU, the memory, and the CPU-memory system under test are fully operational. Additionally, the number of CPU clock cycles and the execution time are established by simulating the execution of the test program code as well. Given the speed of the system clock as well as the number of bytes per instruction executed, the exemplary system not only expects a computed result equivalent to the simulated results, but such results should also be anticipated during a certain period of time after the test program code begins execution. A result outside of a predetermined time interval will indicate a non-conforming CPU-memory system.

Continuing with the example of testing an Intel-based computing device, procedures 410, 412 and 414 are performed employing a MS-DOS operating system, or the like. At 410, the CPU is switched to "Protected" mode. Protected mode provides for full access to all of the system's memory and permits addressing beyond the 1 MB limit as is the case in the default processor mode in the MS-DOS operating system.

At 412, the segment limits (i.e., memory access limits stored in segment limit registers) are changed to increase the sections in memory for testing purposes. For example, the segment sizes are set from 64 KB (i.e., 16 bit address) at 4 GB (i.e., 32 bit address).

At 414, the CPU is switched into real mode, or to "Big" real mode. Once in big real mode, the segment register limits set in protected mode are "honored" and allow continued 32-bit memory address references. Thus, a CPU operating in big real mode has access to the entire 4 GB address space for testing and operational purposes. It should be understood that architecturally different CPUs, memories, and operating systems need not perform 410, 412 and 414 to practice an embodiment of the present invention. It should also be understood that systems having more system memory than can be directly addressed by the CPU (for example, more than 4 GB for an Intel Pentium or X86 system) requires CPU-specific mechanisms for accessing those parts of the system memory that is beyond the directly addressable area.

At 416, the system memory to be tested is then loaded, or programmed into area "A." Depending on the operating system and the CPU-memory system in which the inventive method is performed, permission may also be required to access all or some of the memory in area "A." For example, different operating systems may require authorization before accessing otherwise reserved memory locations for test.

At 418, exceptions and errors, and their handler routines, are enabled so that CPU-memory system can report a defect and the type of defect experienced during test program code execution. That is, the CPU will indicate whether an illegal operation or failure mode is detected.

Additionally, interrupts are disabled so that CPU is not interrupted during the execution of the test program out of the system memory. Pressing a key on a keyboard, for example, which otherwise causes an interrupt to be generated, even if generated during the test, will not interfere with the exemplary testing method discussed herein. Furthermore, other interrupts and their interrupt service routines are similarly disabled to, for example, prevent an I/O device from disrupting the CPU while the test program code is executing, such as an input via the keyboard.

Although most interrupts and their handlers are disabled during the test, the CPU can still be interrupted, but only for a limited subset of events. Such events correspond to a limited number of interrupts generated during the execution of test program code. When one of these interrupts is invoked, it generally indicates that there is a critical failure associated with CPU-memory system under test. When a critical failure arises, such as a memory defect or bus defect (i.e., the interconnectivity within the CPU-memory system), a hardware interrupt may be invoked. An example of a hardware interrupt which might be invoked includes a Non-Maskable Interrupt (i.e., "NMI"), which cannot be masked by software. In a specific embodiment of the present invention, the system and method includes customized exception handler routines for performing certain sets of processes when an error arises during the execution of the test program code.

At 420 the exemplary system stores, or sets to zero, an initial CPU clock cycle count. The CPU clock cycle count is the number of clock cycles that the CPU-memory system is expected to clock through while performing the instructions of the test program code. Also at 420, the system also starts a timer for measuring the execution time of the test program code. More specifically, the timer measures the amount of time the system under test takes to reach an expected computational result after beginning the test. The system and method should not be restricted, however, to only those metrics illustrated herein. The exemplary system and method may use other metrics in determining whether a CPU-memory is fully operationally and without defect.

Figure 1:
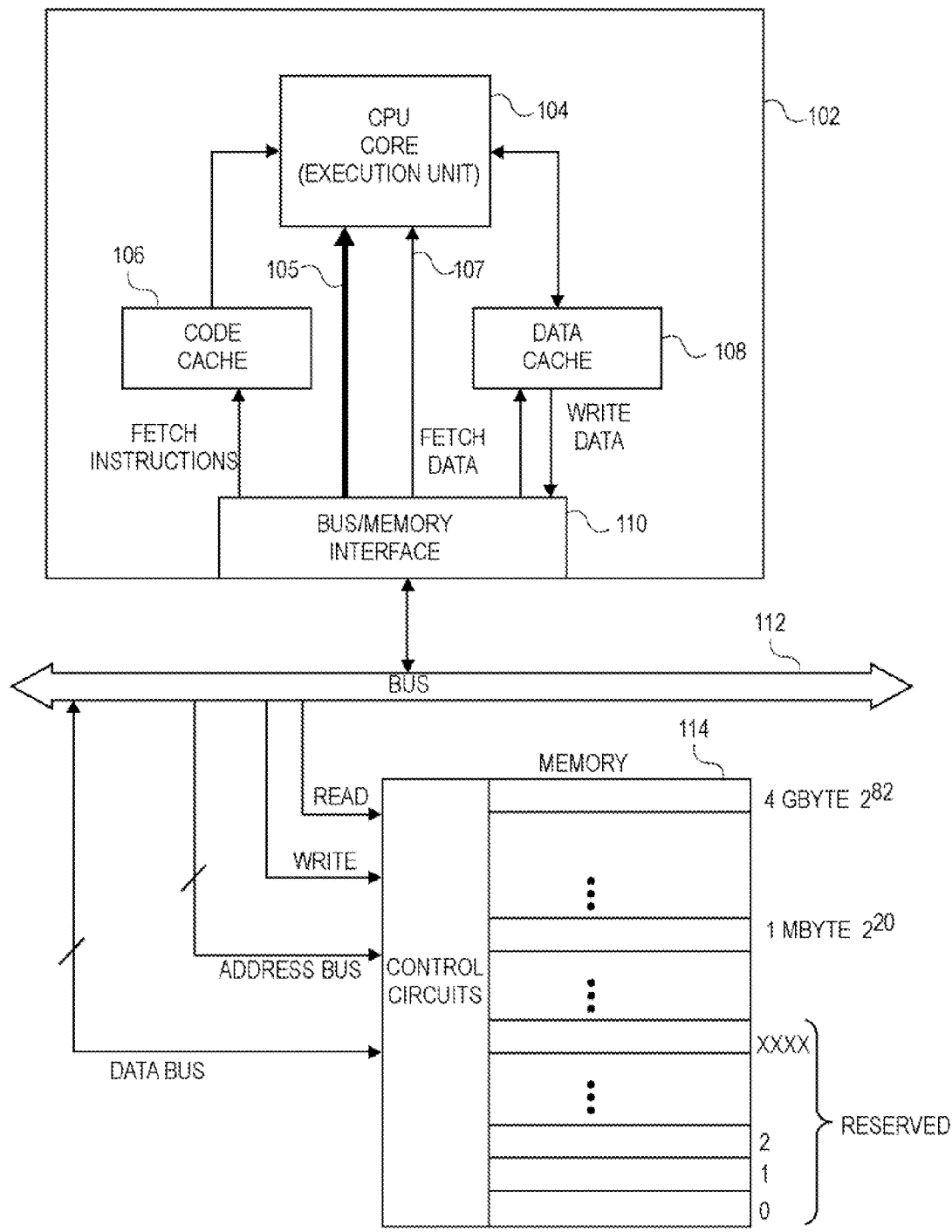
FIG. 1 is an exemplary CPU-memory system under test according to an embodiment of the present invention.

At 422, the CPU begins execution of the previously loaded test program code by fetching instructions having both code and data from the system memory. In an exemplary system shown in FIG. 1, CPU 102 addresses the memory locations via the address bus to fetch the test program code from memory 114. The contents of memory 114 is then provided to the CPU core 104 via a system bus 112 and bus/memory interface 110. In an embodiment of the present invention where a code cache 106 and a data cache 108 are interposed between the CPU core 104 and bus/memory interface 110, the contents of memory 114 are parsed into respective code segments and data segments.

Hence, both the code access path 105 and data access path 107 from the bus/memory interface 110 to the CPU core 104 are employed in determining whether the CPU-memory system is defective. Under anomalous conditions, for example, certain instruction execution sequences may cause the code portion of an instruction to corrupt without affecting the data portion of an instruction. This type of failure mode thus necessitates monitoring the performance of the CPU during the execution of the code-based memory test.

If an anomalous condition affects either the system memory or the code access path for providing instructions to the CPU, then the CPU generally responds to by initiating an exception error. This response by the CPU might also halt the processor. When such an anomalous condition is detected, it generally is an indication of a system memory failure. A defective CPU, however, might in itself corrupt a particular instruction before the code reaches the CPU core. For example, the code access path to and from the code cache might be problematic. This failure mode is detectable by using the system and method of the present invention. Furthermore, the data access path which carries the data portion of the instruction from the bus/memory interface to the CPU core might manifest itself as a defective memory. More specifically, such a defect may arise if the data access path is unable to properly convey data (e.g., a defect in the data access path related to the data cache). Thus, a defective data access path is another type of failure mode detectable by the system and method described herein.

To illustrate such failure modes, suppose an instruction ADD EAX, #3 is understood to indicate the action of "adding the immediate value of 3 to the current contents of EAX, whereby the result is stored in EAX." Assume for this example, that such an instruction requires only one memory location and is repeated for N memory locations of the system memory. If EAX is initialized to the value of "0," then after executing an N number of ADD EAX, #3 instructions, the contents of the EAX should have a value of N×3 (e.g., 0+3+3+3 . . . +3, where the last 3 is the Nth 3). This is the expected value which will be used to compare against the computational result to determine whether the test was successful. If the data portion of the instruction is corrupted in one or more of the fetched ADD instructions from the value of 3 to 2, for example, then after executing N instructions, the EAX will not contain the value of N×3. Since the computational result will be not equal to the expected valued of N×3, the system will generate an indication that the test failed.

As another example, if the op-code portion of the instruction is, for example, corrupted from the ADD instruction to another instruction, such as the SUB instruction, then the computational result would be equivalent to N×−3, if the SUB instruction was executed an N number of times. This type of failure mechanism is also detectable by the system and method of the present invention, since the actual result of N×−3 is not equivalent to the expected result of N×3.

Alternatively, the op-code portion of the instruction might be corrupted into an invalid op-code. If the CPU detects an invalid op-code, it would then issue an appropriate exception indicating the occurrence of an illegal operation. Hence, if an unexpected or non-recognizable op-code is encountered, the CPU-memory system will be deemed to not have passed. It should be understood that the detected failure mechanisms might occur during only one fetched instruction execution cycle or might occur over the execution of the entire test program code.

At 424, the timer that was started at 422 is stopped. The value of the stopped timer thus reflects the amount of time (e.g., in units of seconds) it took for the test program code to execute according to the exemplary method of testing the CPU-memory system. Also at 424, the exemplary system stores or records CPU clock cycle corresponding to the last instruction executed from system memory. Given the beginning and end clock cycle count, the total number of clock cycles occurring during the test is available to verify whether the actual number of clock cycles approximate the predicted number of clock cycles, as determined by the previous simulation.

At 426, the final computational result or results are determined, thus concluding the execution of the code from system memory. Continuing with the above incrementing example, the last increment INC FAX instruction is completed, where the value in EAX increments from N−1 to N. If ending code is implemented in the end of the test program code, then this code will complete the test program code execution.

At 428, the exceptions and errors handler routines which were enabled at 418 are now disabled, and the previously disabled interrupts are again enabled to allow the computing system to operate as intended. For example, if an invalid op-code was received during the running of the test program code, then an exception handler will indicate such an occurrence.

At 430, the actual results are verified against the expected results to determine whether the CPU-memory system under test ("SUT") will be deemed to have "passed" the test. If the results are not those which were expected, the CPU-memory SUT will be considered "not passed." Furthermore, the execution run time as determined (e.g., by the timer) and the CPU clock cycle count will be also compared against the predicted results. It should be recognized by a skilled artisan that a margin of error, or tolerance, for both the run time and the cycle count may be introduced into the determination.

The actual run time and the actual clock cycle count, for example, need only fall within an acceptable range for the CPU-memory SUT to be deemed "passed." Hence, the SUT will be deemed "not passed" if either the run time and the cycle count fall outside acceptable tolerances, even if the computational results are equivalent to the predicted result. In the event a non-conforming result is detected, an associated exception or error handler operates to branch the flow of control of the CPU to address the error condition to correct or to report the error condition.

At 432, an indication is generated as to whether the SUT did "pass" or did "not pass" the test (i.e., whether the actual results, time, cycle count were within parametric tolerances). If all parameters are nominal, then at 434 the test is deemed successful and is reported as such. If one or more of the parameters, however, fall outside the nominal range, then at 436, the one or more errors are reported.

If it is determined that the memory is defective, either the CPU-memory system or the operating system is reconfigured to remove the defective memory locations and/or units. If a CPU itself is deemed to be defective, then in a multi-CPU system, the CPU-memory system configures itself to remove the defective portions of the CPU or the entire CPU itself, or the operating system is instructed to no longer use the CPU for further computations. Removing a defective CPU or memory device or portion thereof, includes physical removal and/or replacement from the CPU-memory system. Removal of the CPU might simply be excluding the use of the defective CPU by reconfiguring the CPU-memory system. For example, in a computing device with 4 CPUs, where 1 is defective, the remaining 3 CPUs will operate as if the defective CPU is not present. Removal of the system memory, may be physical or may simply be the de-allocation of the defective portions of memory, wherein the system memory is reconfigured to exclude the defective portions. The system memory is thus reconfigured to be at least one contiguous memory space, albeit smaller due to the removed defective portion. Additionally, removal of the system memory might also be as simple as allocation of the defective portions of memory using operating system specific instructions that disallow use of the same memory for any other application.

According to another embodiment of the present invention, if a defective CPU or memory is found, a computer device user and/or system management software is notified such that appropriate action may be taken to resolve the problem.

The foregoing description of a specific embodiment is described in general terms and it will be understood by those skilled in the art that the invention has general application to many different CPUs, including Advanced Micro Device's Athlon® processors, Transmeta's Crusoe® processors, Motorola's PowerPC® processors, and the like. Furthermore, the CPU-memory systems described below may operate in environments regardless of the operating systems, such as MICROSOFT WINDOWS, APPLE MACINTOCH OS (Operating System), OS/2 (OPERATING SYSTEM 2), UNIX, etc.

The above description is illustrative and not restrictive. Many variations of the invention will become apparent to those of skill in art upon review of this disclosure. It is within the scope of the present invention to use the exemplary system and method for testing any memory associated with the computing device, including cache memories, graphic memories, and other types of storage media known in the art. Furthermore, the above described method of testing CPU-memory systems is also applicable to all types of embedded processing systems, including wireless telephones, automobile engine control, etc. The scope of the invention should, therefore, be determined not with reference to the above description, but instead should be determined with reference to the appended claims along with their full scope of equivalents.

What is claimed is:

1. A method for detecting a defect in a computing system including one or more central processing units (CPUs) and a system memory configurable to de-allocate defective portions thereof, the method comprising:
   loading a test program code into an area of the system memory to be tested, the test program code having a plurality of instructions configured to detect one or more defects in the system memory;
   fetching an instruction of the test program code from the system memory;
   executing the fetched instruction with a CPU; and
   determining whether the executed instruction yields a test result in conformance with an expected result.

2. The method of claim 1, further comprising reporting the test result.

3. The method of claim 1, further comprising:
   de-allocating a portion of the system memory upon determining that the portion is defective; and
   removing a CPU upon determining that the CPU is defective.

4. The method of claim 1, wherein loading the test program code further comprises:
   determining the area of the system memory to be test;
   generating the test program code designed to detect the one or more defects; and
   simulating execution of the test program code to generate the expected result.

5. The method of claim 1, wherein loading the test program code further comprises:
   switching at least one CPU to protect mode;
   changing a segment limit of the at least one CPU; and
   switching the at least one CPU to big real mode.

6. The method of claim 1, further comprising:
   before executing the fetched instruction,
   installing an exception handler to branch a flow of CPU program control upon detection of a defect;
   disabling the interrupts to prevent interruption in the execution of the test program code;
   after executing the instruction,
   enabling the interrupts; and
   removing the exception handler.

7. The method of claim 1, wherein the exposed result includes one or more metrics.

8. The method of claim 7, wherein determining whether the executed instruction yields a test result in conformance with the expected result further comprises comparing the test result against at least one metric.

9. The method of claim 8, wherein the at least one metric is a numerical result.

10. The method of claim 8, wherein the at least one metric is a number of CPU clock cycles.

11. The method of claim 8, wherein the at least one metric is a number of seconds or a fraction thereof representing an execution run time.

12. An apparatus for use by a computer user for detecting a defect in a computing system including one or more central processing units (CPUs) and a system memory configurable to de-allocate defective portions thereof, wherein at least one CPU includes a code cache and a data cache, the computing system configured to fetch an instruction of a test program code from the system memory for testing the one or more CPU and the system memory, the apparatus comprising:

means for detecting a first defect related to a first corrupted portion of the fetched instruction, where the first corrupt portion represents data; and means for detecting a second defect related to a second corrupted portion of the fetched instruction, where the second corrupt portion represents code.

13. An apparatus of claim 12, further comprising:
means for removing a defective CPU from the computer system, if so detected; and
means for removing a defective portion of system memory from the computer system, if so detected.

14. An apparatus of claim 12, further comprising:
means for reporting whether the CPU and the system memory are defective to the computer user.

15. An apparatus of claim 12, wherein the first defect is due to a defective data access path.

16. An apparatus of claim 12, wherein the second defect is due to a defective code access path.

17. A computer software product for detecting a defect in a computing system including one or more central processing units (CPUs) and a system memory configurable to de-allocate defective portions thereof, the computer software product includes a medium readable by a CPU, the medium having stored thereon:

a first sequence of instructions which, when executed by the CPU, causes the CPU to load a test program code into an area of the system memory; and a second sequence of instructions which, when executed by the CPU, causes the CPU to indicate the presence of the defect related to a code portion of a fetched instruction of the test program code; and a third sequence of instructions which, when executed by the CPU, causes the CPU to indicate the presence of the defect related to a data portion of the fetched instruction of the test program code.

18. The computer software product of claim 17, further comprising:

a fourth sequence of instructions which, when executed by the CPU, causes at least one of the CPUs to be removed from the computer system; and a fifth sequence of instructions which, when executed by the CPU, causes at least one portion of the system memory to be removed from the computer system.

19. A computer-readable medium having stored thereon instructions which when executed by a CPU, cause the CPU to perform steps of:

loading a test program code into an area of a system memory, the test program code having a plurality of instructions configured to detect one or more defects in the system memory;

fetching an instruction of the test program code from the system memory;

executing the fetched instruction within a CPU; and determining whether the executed instruction yields a test result in conformance with an expected result;

wherein a nonconforming test result indicates the presence of the defect in the system memory.

20. A method for performing ongoing testing to detect defects in a computer system including one or more central processing units (CPUs) and a system memory configurable to de-allocate defective portions thereof, the method comprising:

loading a test program code into an area of the system memory to be tested, the test program code having a plurality of instructions configured to detect one or more defects in the system memory; and periodically, fetching an instruction of the test program code from the system memory;

executing the fetched instruction with a CPU; and responsive to the results of the execution of the test program code, determining whether instructions can be executed from the section of memory.

* * * * *